United States Patent
Chang

(10) Patent No.: US 10,444,867 B2
(45) Date of Patent: *Oct. 15, 2019

(54) TRANSMITTER AND TRANSMITTING METHOD THEREOF

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 87 days.

This patent is subject to a terminal disclaimer.

(21) Appl. No.: 15/459,186

(22) Filed: Mar. 15, 2017

(65) Prior Publication Data

US 2017/0185174 A1    Jun. 29, 2017

Related U.S. Application Data

(63) Continuation of application No. 14/537,265, filed on Nov. 10, 2014, now Pat. No. 9,632,617.

(60) Provisional application No. 61/902,137, filed on Nov. 8, 2013.

(30) Foreign Application Priority Data

Dec. 31, 2013    (TW) .............................. 102149229 A

(51) Int. Cl.
  *G06F 3/041*    (2006.01)
  *G06F 3/0354*   (2013.01)
  *G06F 3/044*    (2006.01)
  *G06F 3/038*    (2013.01)

(52) U.S. Cl.
  CPC .......... *G06F 3/03545* (2013.01); *G06F 3/038* (2013.01); *G06F 3/0383* (2013.01); *G06F 3/044* (2013.01); *G06F 3/0416* (2013.01); *G06F 2203/04101* (2013.01); *G06F 2203/04104* (2013.01)

(58) Field of Classification Search
  CPC ....... G06F 3/0418; G06F 3/344; G06F 3/3545
  USPC ........................................................ 345/173
  See application file for complete search history.

(56) References Cited

U.S. PATENT DOCUMENTS

| | | | |
|---|---|---|---|
| 9,218,070 B2 | 12/2015 | Oda et al. | |
| 2005/0189154 A1 | 9/2005 | Perski et al. | |
| 2011/0155479 A1* | 6/2011 | Oda ..................... | G06F 3/03545 |
| | | | 178/18.06 |
| 2014/0028577 A1* | 1/2014 | Krah ..................... | G06F 3/0416 |
| | | | 345/173 |

FOREIGN PATENT DOCUMENTS

| | | |
|---|---|---|
| CN | 102109923 | 6/2011 |
| TW | 201314546 | 4/2013 |

* cited by examiner

*Primary Examiner* — Towfiq Elahi
(74) *Attorney, Agent, or Firm* — WPAT, PC

(57) ABSTRACT

The present invention provides a transmitter which is configured to transmit an electrical signal to a touch sensitive device according to a transmitter status. After analyzing the electrical signal, the touch sensitive device is able to find out the transmitter status and a relative position of the transmitter with respect to the touch sensitive device. The electrical signal is mixed from a plurality of signals having different frequencies.

12 Claims, 9 Drawing Sheets

TRANSMITTER AND TRANSMITTING METHOD THEREOF

CROSS REFERENCE TO RELATED APPLICATIONS

This application is a continuation application of U.S. patent application Ser. No. 14/537,265, filed on Nov. 10, 2014 which claims priority under 35 U.S.C 119 to Taiwan patent application, No. 102149229, filed on Dec. 31, 2013, and the benefit of U.S. Provisional Application No. 61/902,137, filed on Nov. 8, 2013, the disclosures of which are incorporated herein by reference.

BACKGROUND OF THE INVENTION

1. Field of the Invention

The present invention relates to a transmitter applicable for touch sensitive panels, and more particularly, to a transmitter capable of transmitting a plurality of frequencies simultaneously.

2. Description of the Prior Art

Touch sensitive panels or screens are important human-machine interfaces, especially on consumer electronic products like portable phones, tablets, or Personal Digital Assistances (PDAs). Touch sensitive screens are one of the main input/output (I/O) devices. Since capacitive touch sensitive screens, especially projected capacitive types, are very sensitive to finger touches, it has become the main design choice for touch sensitive panels/screens on the market.

Touching the screen with the tip of a finger will inevitably block part of the screen, and the user cannot confirm the point that is being detected by the touch sensitive with his/her eyes. In addition, one cannot have as accurate control as using a pen (stylus) when using the finger tips to write. Therefore, in addition to using the finger tips to touch the screen, the user may also wish to use a stylus for input to the screen.

Generally speaking, the area of the touch sensitive screen touched by the tip of a stylus is much smaller than that touched by a fingertip. For a capacitive touch sensitive screen, it is a big challenge to detect the capacitive changes caused by the stylus. Especially in many professional graphics or typesetting application environments, a lot of functional buttons are added to the stylus. Under such situations, the touch sensitive screen not only needs to detect the minute tip of the stylus, but also needs to detect whether the buttons are being pressed.

In summary, there is a need for a technique that supports a stylus with multiple functional input interfaces to allow a touch sensitive screen to detect the stylus and at the same time detecting the statuses of the functional buttons on the stylus.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In an embodiment, the present invention provides a transmitter for transmitting an electrical signal to a touch sensitive device according to a transmitter status, so that after analyzing the electrical signal, the touch sensitive device is able to find out the transmitter status and a relative position of the transmitter with respect to the touch sensitive device, wherein the electrical signal is mixed from a plurality of signals having different frequencies.

In another embodiment, the present invention provides a transmitting method for a transmitter, which may include: generating a transmitter status according to a status in a sensor module included in the transmitter; and transmitting an electrical signal to a touch sensitive device according to the transmitter status, so that after analyzing the electrical signal, the touch sensitive device is able to find out the transmitter status and a relative position of the transmitter with respect to the touch sensitive device, wherein the electrical signal is mixed from a plurality of signals having different frequencies.

In summary, one main principle of the present invention lies in the use of an electrical signal mixed from a plurality of frequencies, so that a touch sensitive device may be able to detect the relative position of a transmitter transmitting the electrical signal and a status of at least one sensor on the transmitter.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
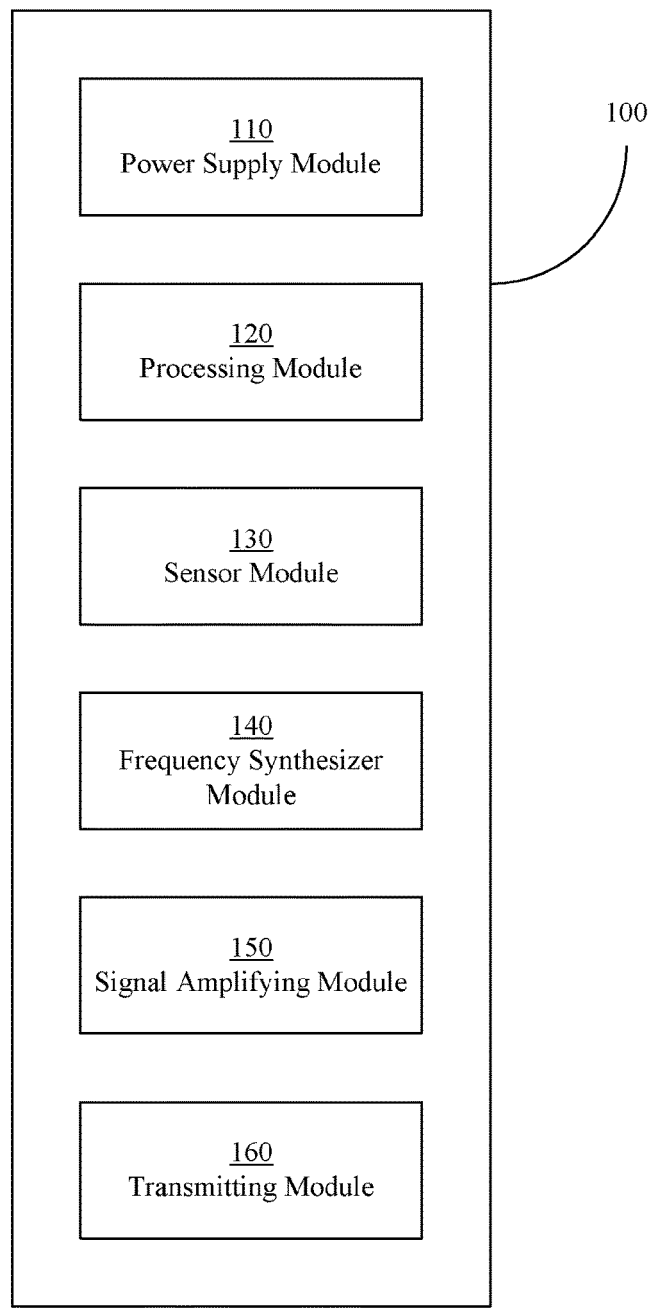
FIG. 1 is a schematic diagram illustrating a transmitter in accordance with an embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

In an embodiment, the transmitter mentioned in the present invention may be a stylus. In some embodiments, the transmitter may be other types of objects that can be placed on a touch sensitive panel or screen. For example, when the touch sensitive screen displays a chessboard, the transmitter may be the chess. Once the gaming program detects the location of the chess on the touch sensitive screen, it will know the location of the chess.

Regardless of how much contact area there is between the transmitter and the touch sensitive panel and how many touch points there are, the transmitter at least includes a transmitting anchor point. The touch sensitive panel or screen may detect the location of the transmitting anchor point as the representative location of an object represented by the transmitter on the touch sensitive panel or screen. In an embodiment, the transmitter does not need to have contact with the touch sensitive panel, only the transmitting anchor point needs to be in proximity to the touch sensitive panel for the touch sensitive panel to detect the transmitting anchor point.

In an embodiment, the transmitter may include a plurality of transmitting anchor points. When the touch sensitive panel detects a plurality of transmitting anchor points, it is able to detect the facing direction of the transmitter. In another embodiment, the transmitter may include m transmitting anchor points, and when the touch sensitive panel detects n of the transmitting anchor points, it is able to detect the stance of the transmitter on the touch sensitive panel. For example, the transmitter is a triangular body with four transmitting anchor points; each transmitting anchor point is positioned at one vertex of the triangular body, by detecting three transmitting anchor points on the touch sensitive panel, the touch sensitive panel will know which face of the triangular body is in contact with it. The transmitter may also be a square body with eight transmitting anchor points, where each transmitting anchor point is positioned at a vertex of the square body. This type of transmitter can be used as a dice.

Referring to FIG. 1, a schematic diagram illustrating a transmitter 100 in accordance with an embodiment of the present invention is shown. The transmitter 100 includes a power supply module 110, a processing module 120, a sensor module 130, a frequency synthesizer module 140, a signal amplifying module 150 and a transmitting module 160. As mentioned above, the transmitter 100 may assume the shape of a stylus. In an embodiment, the above modules may be arranged inside the stylus according to the order shown in FIG. 1, the bottom of the stylus is to be in contact with or proximity to a touch sensitive panel. The transmitter 100 may include a master switch for turning off the power of the transmitter 100.

The power supply module 110 may include circuits associated with power supply and control, such as a battery pack, DC-to-DC voltage converter and a power management unit. The battery pack can be rechargeable batteries or disposable batteries. When the battery pack includes rechargeable batteries, the power supply module 110 may further include a charger circuit for inputting an external power into the rechargeable batteries. Moreover, the external power can be input into the rechargeable batteries wirelessly, or the battery pack can be replaced by capacitors. In an embodiment, the charger circuit can be included in the power management unit for protecting the rechargeable batteries from over discharging and over charging.

The above processing module 120 is used for controlling the transmitter 100, which may include a microprocessor. The above sensor module 130 may include at least one sensor. The sensor may, for example, include a pressure sensor at the tip of the stylus, a button, an accelerometer, an inductance meter, a knob, or the like. The status of the sensor may be of binary form. For example, the button may be in a pressed-down status or a released status. The status of an accelerometer may include stationary or in motion. The statuses of the sensor may include n-ary discrete values. For example, the pressure experienced by the pressure sensor may be divided into four levels, ten levels, or sixteen levels. The statuses of the knob may also be in four levels, ten levels, or sixteen levels. The status of the sensor can also be an analog interval. The above processing module 120 is able to detect the status of the sensor in the sensor module 130, and generate a transmitter status accordingly. For example, the tip of the stylus is connected to an elastic element. When the tip of the stylus is pressed down, the elastic element will deformed as a result of the pressure. The above pressure sensor is connected to the spring element for detecting the pressure experienced by the elastic element. The above elastic element may be a spring, an elastic rubber or foam or other types of structure or material that buffers pressure and allows the tip to move with respect to the body of the stylus; the present invention is not limited thereto. In addition, the above pressure sensor may include a piezoelectric material that generates an electric signal when deformed.

The above frequency synthesizer module 140 includes a plurality of frequency generators and a frequency synthesizer or mixer. In one embodiment, the above plurality of frequency generators may include a plurality of quartz oscillators. In another embodiment, the above frequency generators can use a single frequency source, and generate a plurality of frequencies through the use of dividers, frequency multipliers, phase lock circuits and other appropriate circuitries. These frequencies are not mutually resonant frequency waves, and different from and not mutually resonant with the frequency emitted by the touch sensitive panel for detecting the transmitter 100. This avoids interference between the various frequencies.

In some embodiments, the ranges of the plurality of frequencies fall within the detectable frequency range of the touch sensitive panel. For example, a frequency range that generally can be detected by a touch sensitive panel is approximately between 90 kHz and 250 kHz, so the frequencies generated by the plurality of frequency generators may fall within this range.

In an embodiment, the above processing module 120 may decide which frequencies in the plurality of frequencies are to be synthesized by the frequency synthesizer module 140. In other words, a specific frequency can be controlled not to be added to the mixer. Of course, the signal strength of individual frequency may also be controlled. In another embodiment, the above processing module 120 may decide the ratios of signal strengths of various frequencies for the frequency synthesizer module 140. For example, the ratio of the signal strength of a first frequency to that of a second frequency may be 3:7. As another example, the ratio of the signal strengths between a first, a second and a third frequency may be 24:47:29. One with ordinary skills in the art can appreciate that although the frequency synthesizer module 140 can be used for generating and mixing multiple frequencies, the processing module 120 may also instruct the frequency synthesizer module 140 to generate a single frequency without mixing with any other frequencies based on the statuses of the sensors in the sensor module 130.

In an embodiment, the signal strength of a particular frequency may correspond to a pressure sensor at the tip of the stylus or a knob with multiple levels in the sensor module 130. For example, in a graphics software, the pressure sensor at the tip of a stylus may indicate the shades of the color, and the degree of rotation of the knob may indicate the diameter of the brush. Thus, the signal strength of a first frequency can be used to indicate the pressure on the pressure sensor, and the signal strength of a second frequency can be used to indicate the degree of rotation of the knob.

In another embodiment, the proportion of the signal strength of one frequency among the signal strength after mixing can be used to correspond to the n-ary statuses of a sensor. For example, when the ratio of the signal strengths of a first frequency to a second frequency is 3:7, it indicates the status of the sensor is in the third level among ten levels. If the ratio of the strengths is changed to 6:4, this indicates the status of the sensor is in the sixth level among ten levels. In other words, if there are three frequencies, then the ratio of the signal strengths of a first frequency to a second frequency, the ratio of the signal strengths of the second frequency to a third frequency, and the ratio of the signal strengths of the third frequency to the first frequency can be used to indicate three statuses of the n-ary sensor, respectively.

The above signal amplifying module 150 is used for amplifying the signal mixed by the frequency synthesizer module 140. In an embodiment, the above signal amplification corresponds to the pressure sensor in the sensor module 130 at the tip of the stylus. If the circuit of the pressure sensor corresponds to a variable gain amplifier (VGA) of the signal amplifying module 150, the circuit of the pressure sensor may directly control the gain of the VGA without going through the processing module 120. Therefore, the mixed signal outputted by the frequency synthesizer module 140 can be amplified by the VGA and sent to the transmitting module 160.

As mentioned before, the signal strength of a particular frequency in the mixed signal can be used to indicate a status of an n-ary sensor. The ratio of the signal strengths of two frequencies in the mixed can also be used to indicate a status of the n-ary sensor. Alternatively, the overall signal strength of the mixed signal can be used to indicate a status of the n-ary sensor. Meanwhile, the signal amplifying module 150 can be use to amplify the mixed signal to indicate the status of another n-ary sensor. For example, the transmitter 100 includes two n-ary sensors: one is a pressure sensor provided at the tip of the stylus, and the second one is a knob provided on the body of the stylus, they are used to indicate the color shade and the diameter of the stylus. In an embodiment, the strength of the mixed signal can be used to indicate the degree of pressure experienced by the pressure sensor. The status of the knob can be indicated by the ratio of the signal strengths of two frequencies among the mixed signal or by amplifying or reducing the strength of the overall mixed signal to a particular level through the signal amplifying module 150.

In an embodiment of the present invention, the transmitting module 160 is included in a pressure sensor provided at the tip of the stylus. The transmitting module 160 can be an array of antennas or a conductor or an electrode with the appropriate impedance value, which can also be called an excitation electrode. The conductor or electrode at the tip of the stylus is connected to the pressure sensor. When the transmitting module 160 emits a signal and touches the touch sensitive panel/screen, the signal will flow into the sensing electrodes of the touch sensitive panel/screen. When the transmitting module 160 is near but not in contact with the touch sensitive panel/screen, the sensing electrodes of the touch sensitive panel/screen may still experience the signal variations on the transmitting module 160, therefore allowing the touch sensitive/panel to detect the approaching of the transmitter 100.

When the frequency synthesizer module 140 synthesizes n frequencies, the frequencies of the signal can be used to modulate $2^n$ statuses. For example, when n equals to three, the frequencies of the signal can be used to modulate eight statuses. Referring to Table 1, the transmitter statuses and their corresponding statuses of sensors are shown.

TABLE 1

|  | Pressure Sensor | First Button | Second Button |
| --- | --- | --- | --- |
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Fifth Transmitter Status | No Contact Pressure | Released | Released |
| Sixth Transmitter Status | No Contact Pressure | Pressed | Released |
| Seventh Transmitter Status | No Contact Pressure | Pressed | Pressed |
| Eighth Transmitter Status | No Contact Pressure | Released | Pressed |

In the embodiment shown by Table 1, the sensor module 130 includes three sensors: a pressure sensor at the tip of the stylus, a first button and a second button. The status of these three sensors are all in binary forms, so there are eight different combinations of transmitter statuses as shown in Table 1. One with ordinary skills in the art can appreciate that the correspondence of the transmitter statuses and the sensors' statuses can be changed according to needs. For example, the first transmitter status can be swapped with another transmitter status, for example, the seventh transmitter status.

Referring to Table 2, the transmitter statuses and their corresponding frequency mixings are shown. As described before, the frequency synthesizer module 140 may synthesize three different frequencies, so each transmitter status may correspond to different combination of the frequencies as shown in Table 2. One with ordinary skills in the art can appreciate that the correspondence of the transmitter statuses and the combinations of frequencies can be changed according to needs. For example, the first transmitter status can be swapped with another transmitter status, for example, the eighth transmitter status.

TABLE 2

|  | First Frequency | Second Frequency | Third Frequency |
| --- | --- | --- | --- |
| First Transmitter Status | Mixed | Mixed | Mixed |
| Second Transmitter Status | Mixed | Mixed | Not Mixed |

TABLE 2-continued

|  | First Frequency | Second Frequency | Third Frequency |
|---|---|---|---|
| Third Transmitter Status | Mixed | Not Mixed | Not Mixed |
| Fourth Transmitter Status | Mixed | Not Mixed | Mixed |
| Fifth Transmitter Status | Not Mixed | Mixed | Mixed |
| Sixth Transmitter Status | Not Mixed | Mixed | Not Mixed |
| Seventh Transmitter Status | Not Mixed | Not Mixed | Not Mixed |
| Eighth Transmitter Status | Not Mixed | Not Mixed | Mixed |

In an embodiment, when the pressure sensor at the tip of the stylus is not under any pressure, the transmitter 100 still mixes the frequencies and sends out a signal. In another embodiment, when the pressure sensor at the tip of the stylus is not under any pressure, the transmitter 100 does not mix the frequencies and transmit any signal. Corresponding to Table 2, this status is the seventh transmitter status. In this embodiment, Table 1 can be altered to become Table 3.

TABLE 3

|  | Pressure Sensor | First Button | Second Button |
|---|---|---|---|
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Seventh Transmitter Status | No Contact Pressure | Released | Released |
| Seventh Transmitter Status | No Contact Pressure | Pressed | Released |
| Seventh Transmitter Status | No Contact Pressure | Pressed | Pressed |
| Seventh Transmitter Status | No Contact Pressure | Released | Pressed |

In the embodiments shown in Table 1 to Table 3, the transmitter 100 uses the synthesizing of the frequencies as the only factor of signal modulation. In the following embodiments, in addition to frequency synthesizing, signal strength and/or ratio of signal strengths of different frequencies are included as the factors of signal modulation.

Referring to Table. 4, transmitter frequency statuses and their corresponding sensors' statuses in accordance with an embodiment of the present invention are shown. Compared to the embodiment of Table 1, the statues sensed by the pressure sensor are not limited to binary statuses of contact pressure/no contact pressure, but more than two statuses. Thus, the left column of Table 4 is not called transmitter status anymore, but rather transmitter frequency status. The modulation factors of the transmitter status of this embodiment include, in addition to the frequency status, the signal strength as well.

TABLE 1

|  | Pressure Sensor | First Button | Second Button |
|---|---|---|---|
| First Transmitter Frequency Status | Contact Pressure Level > 0 | Released | Released |
| Second Transmitter Frequency Status | Contact Pressure Level > 0 | Pressed | Released |
| Third Transmitter Frequency Status | Contact Pressure Level > 0 | Pressed | Pressed |
| Fourth Transmitter Frequency Status | Contact Pressure Level > 0 | Released | Pressed |
| Fifth Transmitter Frequency Status | Contact Pressure Level = 0 | Released | Released |
| Sixth Transmitter Frequency Status | Contact Pressure Level = 0 | Pressed | Released |
| Seventh Transmitter Frequency Status | Contact Pressure Level = 0 | Pressed | Pressed |
| Eighth Transmitter Frequency Status | Contact Pressure Level = 0 | Released | Pressed |

Referring to Table 5, transmitter statuses and their corresponding frequency mixings and signal strengths in accordance with an embodiment of the present invention are shown. The signal strength modulation can be the signal strength value of the mixed signal to indicate, for example, the contact pressure level of the pressure sensor.

TABLE 5

|  | First Frequency | Second Frequency | Third Frequency |
|---|---|---|---|
| First Transmitter Frequency Status + Signal Strength Modulation | Mixed | Mixed | Mixed |
| Second Transmitter Frequency Status + Signal Strength Modulation | Mixed | Mixed | Not Mixed |
| Third Transmitter Frequency Status + Signal Strength Modulation | Mixed | Not Mixed | Not Mixed |
| Fourth Transmitter Frequency Status + Signal Strength Modulation | Mixed | Not Mixed | Mixed |
| Fifth Transmitter Frequency Status + Signal Strength Modulation | Not Mixed | Mixed | Mixed |
| Sixth Transmitter Frequency Status + Signal Strength Modulation | Not Mixed | Mixed | Not Mixed |
| Seventh Transmitter Frequency Status + Signal Strength Modulation | Not Mixed | Not Mixed | Not Mixed |
| Eighth Transmitter Frequency Status + Signal Strength Modulation | Not Mixed | Not Mixed | Mixed |

In the embodiment of Table 5, the contact pressure levels of the pressure sensor corresponding to the fifth to the eighth transmitter frequency statues are all zero, so the results of signal strength modulation can also be zero. In other words, no signal is transmitted. In another embodiment, the signal strength modulation can be a constant. This constant signal strength can be different from the signal strengths corresponding to other contact pressure levels of the pressure sensor.

Figure 2:
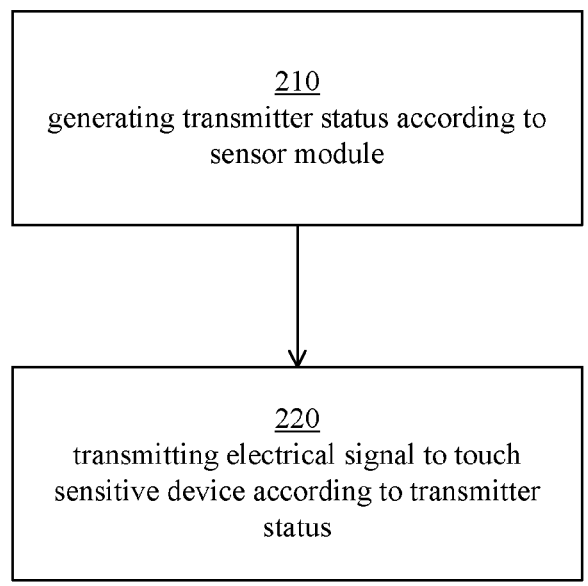
FIG. 2 is a flowchart illustrating a transmitting method in accordance with an embodiment of the present invention.

Referring to FIG. 2, a flowchart illustrating a transmitting method in accordance with an embodiment of the present invention is shown. The transmitting method is applicable to the transmitter 100 shown in FIG. 1, but not limited thereto.

The transmitting method includes two steps. In step 210, a transmitter status is generated based on a status inside a sensor module included in the transmitter. In step 220, an electrical signal is transmitted to a touch sensitive device according to the transmitter status, so that after analyzing the electrical signal, the touch sensitive device is able to find out the transmitter status and a relative position of the transmitter with respect to the touch sensitive device. The electrical signal is mixed from a plurality of signals having different frequencies.

In an embodiment, a sensor inside the sensor module includes one of the following: a button, a knob, a pressure sensor (or a pressure gauge), an accelerometer or a gyroscope. The pressure sensor can be used to sense the contact pressure level between the transmitter and the touch sensitive device.

When the sensor module includes a plurality of sensors, the number of possible statues of the transmitter status is the sum of the number of possible statues of every sensor. Alternatively, in another embodiment, the transmitter status indication is one of arbitrary combinations of every sensor's status indication. In an embodiment, the status indication of a sensor inside the sensor module is a n multiple of two, wherein n is an integer greater than or equal to 0.

The modulation factor of the electrical signal includes one or a combination of: frequency and strength. In an embodiment, the signal strength of the electrical signal corresponds to a status of an n-ary sensor in the sensor module. In another embodiment, the signal strengths of a first frequency and a second frequency mixed in the electrical signal correspond to a status of an n-ary sensor in the sensor module. In yet another embodiment, the signal strength of the electrical signal corresponds to a status of a first n-ary sensor in the sensor module, wherein the ratio of the signal strengths of a first frequency and a second frequency mixed in the electrical signal corresponds to a status of a second n-ary sensor in the sensor module.

One main principle of the present invention lies in the use of an electrical signal mixed from a plurality of frequencies, so that a touch sensitive device may be able to detect the relative position of a transmitter transmitting the electrical signal and a status of at least one sensor on the transmitter.

Figure 3:
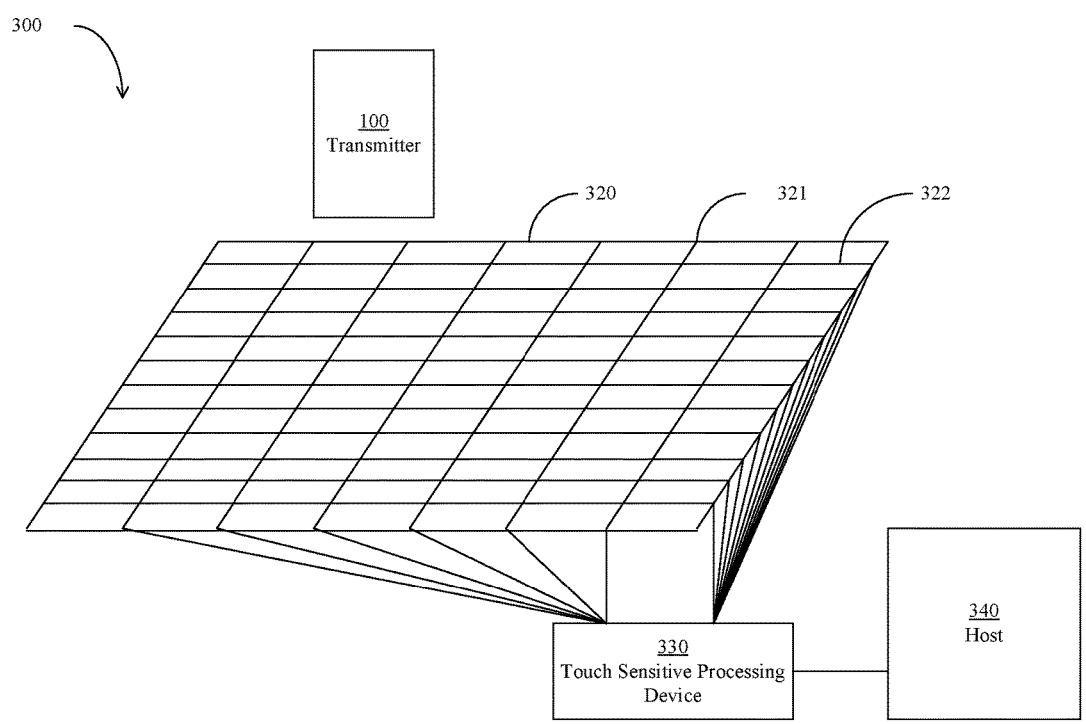
FIG. 3 is a schematic diagram depicting a touch sensitive system in accordance with an embodiment of the present invention.

Referring now to FIG. 3, a schematic diagram depicting a touch sensitive system 300 in accordance with an embodiment of the present invention is shown. The touch sensitive system 300 includes at least one transmitter 100, a touch sensitive panel 320, a touch sensitive processing device 330 and a Host 340. In this embodiment, the transmitter 100 is applicable to the transmitters described in the previous embodiments, especially the embodiments shown in FIGS. 1 and 2. It should also be noted that the touch sensitive system 300 may include a plurality of transmitters 100. The touch sensitive panel 320 is formed on a substrate. The touch sensitive panel 320 can be a touch sensitive screen, but the present invention does not restrict the form of the touch sensitive panel 320.

In an embodiment, a touch sensitive area of the touch sensitive panel 320 includes a plurality of first electrodes 321 and a plurality of second electrodes 322. A plurality of sensing points are formed at the intersections of these two electrodes. These first electrodes 321 and second electrodes 322 are connected to the touch sensitive processing device 330. Under mutual capacitive sensing, the first electrodes 321 are called first conductive strips or driving electrodes, and the second electrodes 322 are called second conductive strips or sensing electrodes. The touch sensitive processing device 330 is able to know the approach or touch (approach/touch) of any external conductive object on the touch sensitive panel 320 by first providing a driving voltage (the voltage of a driving signal) to the first electrodes 321 and then measuring the signal variations of the second electrodes 322. One with ordinary skills in the art can appreciate that the touch sensitive processing device 330 may use mutual- or self-capacitive sensing methods to detect an approaching/touching event or object, and they will not be further described. In addition to mutual- or self-capacitive sensing methods, the touch sensitive processing device 330 may also detect the electrical signal emitted by the transmitter 100 in order to detect the relative position of the transmitter 100 with respect to the touch sensitive panel 320. In an embodiment, the signal variations in the first electrodes 321 and the second electrodes 322 are measured to detect the signal of the transmitter 100 in order to detect the relative position of the transmitter 100 with respect to the touch sensitive panel 320. Since the signal of the transmitter 100 and the mutual-capacitive or self-capacitive driving signal are of different frequencies and not mutually resonant, the touch sensitive processing device 330 is able to distinguish the signal transmitted by the transmitter 100 from the mutual- or self-capacitive driving signal. The detection principle will be detailed in the later sections of the specification. In another embodiment, the touch sensitive panel 320 can be a surface capacitive touch sensitive panel having an electrode at each of the four corners or sides, and the touch sensitive processing device 330 respectively or simultaneously measures the signal variations of these four electrodes to detect the relative position of the transmitter 100 with respect to the touch sensitive panel 320.

FIG. 3 further includes a Host 340, which can be an operating system such as a CPU or a main processor in an embedded system, or other types of computers. In an embodiment, the touch sensitive system 300 can be a table PC. The Host 340 can be a CPU for executing the operating programs of the table PC. For example, the table PC executes an Android operating system, and the Host 340 is an ARM processor executing the Android operating system. The present invention does not limit the form of information transmission between the Host 340 and the touch sensitive processing device 330 as long as the information transmitted is relevant to the approaching/touching event(s) happened on the touch sensitive panel 320.

Figure 4:
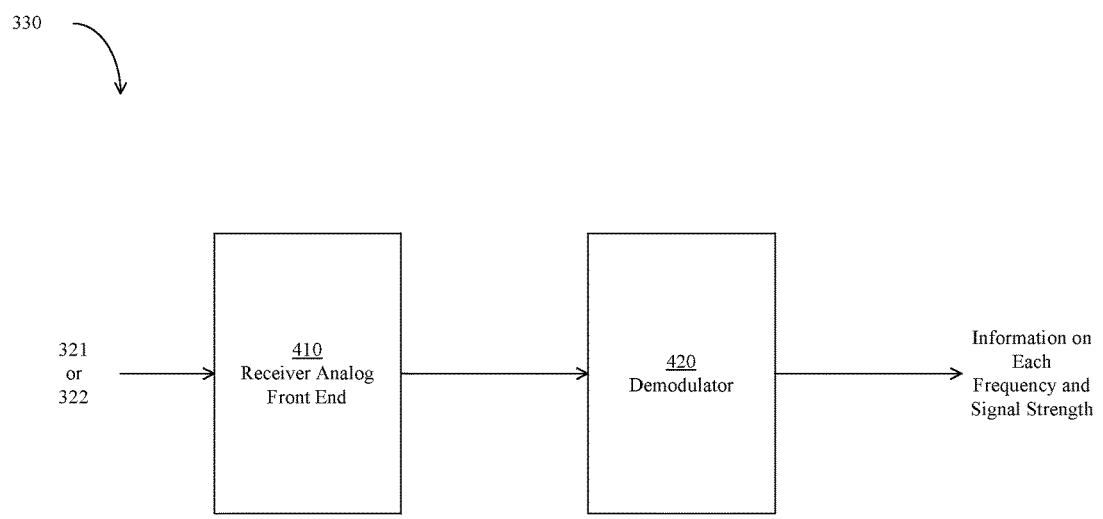
FIG. 4 is a block diagram depicting a portion of a touch sensitive processing device in accordance with the present invention.

Referring to FIG. 4, a block diagram depicting a portion of the touch sensitive processing device 330 in accordance with the present invention is shown. As mentioned earlier, the touch sensitive processing device 330 may use mutual- or self-capacitive sensing principle to detect an approaching/touching event, so details related to the capacitive sensing will not be described hereinafter. The embodiment shown in FIG. 4 includes a receiver analog front end 410 and a demodulator 420.

The receiver analog front end 410 is connected to the first electrodes 321 or the second electrodes 322. In an embodiment, each of the first electrodes 321 and each of the second electrodes 322 are connected to a receiver analog front end 410. In another embodiment, a plurality of first electrodes 321 form a set, and a plurality of second electrodes 322 form a set, and each set of first electrodes 321 corresponds to a receiver analog front end 410, and each set of second electrodes 322 corresponds to another receiver analog front end 410. Each receiver analog front end 410 receives in turn the signal of the first electrodes 321 or second electrodes 322 in the set. In another embodiment, a set of first electrodes 321 and a set of second electrodes 322 correspond to one receiver analog front end 410. The receiver analog front end 410 can first be connected in turn to the first electrodes 321 in the set of the first electrodes 321, and then connected in turn to the second electrodes 322 in the set of the second electrodes 322. On the contrary, the receiver analog front end 410 can first be connected in turn to the second electrodes 322 in the set of the second electrodes 322, and then connected in turn to the first electrodes 321 in the set of the first electrodes 321. In an embodiment, the touch sensitive processing device 330 may only include one receiver analog front end 410. One with ordinary skills in the art can appreciate that the present invention does not limit how the first electrodes 321 or the second electrodes 322 are configured to the receiver analog front end 410. In other words, the number of receiver analog front ends 410 included in the touch sensitive processing device 330 may be smaller than or equal to the sum of the first electrodes 321 and the second electrodes 322.

The receiver analog front end 410 may perform some filtering, amplification or other analog signal processing. In some embodiments, the receiver analog front end 410 can receive the difference between two adjacent first electrodes 321, or the difference between two adjacent second electrodes 322. In an embodiment, each receiver analog front end 410 can output to a demodulator 420. In another embodiment, every $n^{th}$ receiver analog front end 410 may output to a demodulator 420. In yet another embodiment, each receiver analog front end 410 may output to N demodulators 420, wherein N is a positive integer greater than or equal to one. In some embodiments, the touch sensitive processing device 330 may include only one demodulator 420. One with ordinary skills in the art can appreciate that the present invention does not limit how the receiver analog front end(s) 410 is/are configured to the demodulator(s) 420.

The demodulator 420 is used to demodulate the electrical signal transmitted by the transmitter 100 in order to obtain information on each frequency and information on the signal strengths in the received signals of the corresponding first electrodes 321 or second electrodes 322. For example, the transmitter 100 may transmit a signal with three frequencies. The demodulator 420 may obtain the signal strengths for these three frequencies, the ratio(s) of signal strengths of each two or arbitrary two frequencies, and the overall signal strength. In the present invention, the demodulator 420 can be implemented in a digital or analog way; it is described in three different embodiments below.

Figure 5:
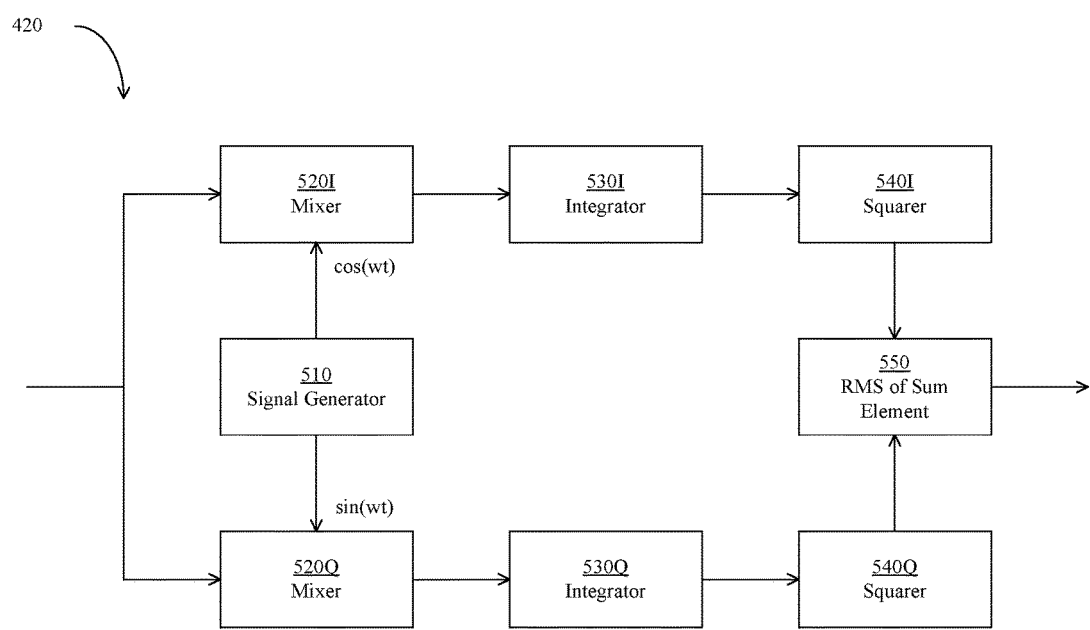
FIG. 5 is a block diagram depicting a portion of an analog demodulator in accordance with an embodiment of the present invention.

Referring to FIG. 5, a block diagram depicting a portion of an analog demodulator 420 in accordance with an embodiment of the present invention is shown. A single analog demodulator shown in FIG. 5 can be used to demodulate every frequency, or a plurality of analog demodulator shown in FIG. 5 can be used to demodulate a plurality of frequencies. For example, when the transmitter 100 transmits N frequencies, N of the analog demodulator shown in FIG. 5 are used demodulate each frequency. A signal generator 510 is used to generate signals of corresponding frequencies.

An analog signal received from the receiver analog front end 410 can be passed through an optional amplifier (not shown) and then to two mixers 520I and 520Q. The mixer 520I receives a cosine signal outputted by the signal generator 510 and mixes it with the analog signal to generate a mixer signal. The mixer 520Q receives a sine signal outputted by the signal generator 510 and mixes it with the analog signal to generate another mixer signal. The mixer signals outputted by the mixers 520I and 520Q are then outputted to integrators 530I and 530Q, respectively. Then, the integrated signals are sent to squarers 540I and 540Q by the integrators 530I and 530Q, respectively. Finally, the outputs of the squarers 540I and 540Q are summed and root-mean-squared by a "Root Mean Square (RMS) of sum" element. As such, the signal strengths corresponding to the signal frequencies generated by the signal generator 510 can be obtained. After the signal strengths of all frequencies are obtained, the ratio(s) of the signal strengths of each two or arbitrary two frequencies and the overall signal strength can then be generated.

Figure 6:
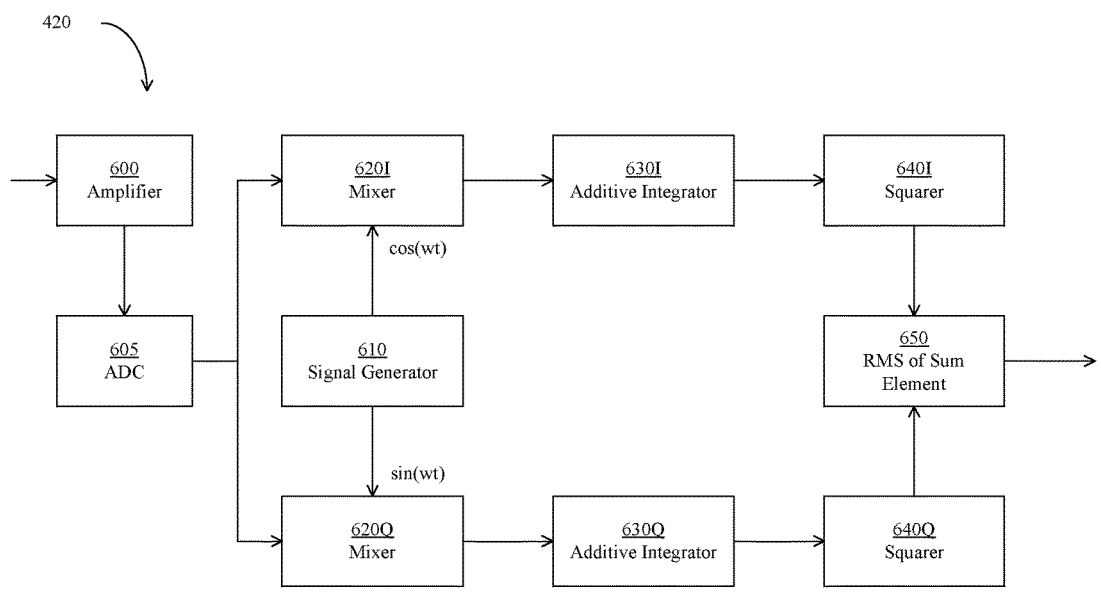
FIG. 6 is a block diagram depicting a portion of a digital demodulator in accordance with an embodiment of the present invention.

Referring to FIG. 6, a block diagram depicting a portion of a digital demodulator 420 in accordance with an embodiment of the present invention is shown. Compared to the embodiment shown in FIG. 5, the embodiment shown in FIG. 6 is carried out in a digital manner. Similarly, a single digital demodulator shown in FIG. 6 can be used to demodulate every frequency, or a plurality of the digital demodulator shown in FIG. 6 can be used to demodulate a plurality of frequencies. For example, when the transmitter 100 transmits N frequencies, N of the digital demodulator shown in FIG. 6 are used demodulate each frequency. A signal generator 610 is used to generate digital signals of corresponding frequencies.

An analog signal received from the receiver analog front end 410 can be passed through an optional amplifier 600 and then to an analog-to-digital converter (ADC) 605. The sampling frequency of the ADC 605 will correspond to the frequency of the signal transmitted by the signal generator 610. In other words, when the ADC 605 is performing a sampling at a first phase, the signal generator 610 will send out first-phase signals to two mixers 620I and 620Q once; when it is performing a sampling at a second phase, the signal generator 610 will send out second-phase signals to the two mixers 620I and 620Q once. The mixer 620I receives a cosine signal outputted by the signal generator 610 and multiplies it with the signal of the ADC 605 to create a mixer signal; the mixer 620Q receives a sine signal outputted by the signal generator 610 and multiplies it with the signal of the ADC 605 to create another mixer signal. For example, the mixer 620I multiplies the first-phase signal with a cosine signal of the first phase to create a mixer signal that is the product of the two; the mixer 620Q multiplies the first-phase signal with a sine signal of the first phase to create a mixer signal that is the product of the two. The mixer signals outputted by the mixers 620I and 620Q are then outputted to Additive Integrators 630I and 630Q, respectively. Then, the addition-integrated signals are sent to squarers 640I and 640Q by the Additive Integrators 630I and 630Q, respectively. Finally, the outputs of the squarers 640I and 640Q are summed and root-mean-squared by a "Root Mean Square (RMS) of sum" element. As such, the signal strengths corresponding to the signal frequencies generated by the signal generator 610 can be obtained. After the signal strengths of all frequencies are obtained, the ratios of the signal strengths of each two frequencies and the overall signal strength can then be generated. In FIG. 6, the signal after being sampled by the ADC 605 is a digital signal, and the following signal processes are all digital signal processes.

Figure 7:
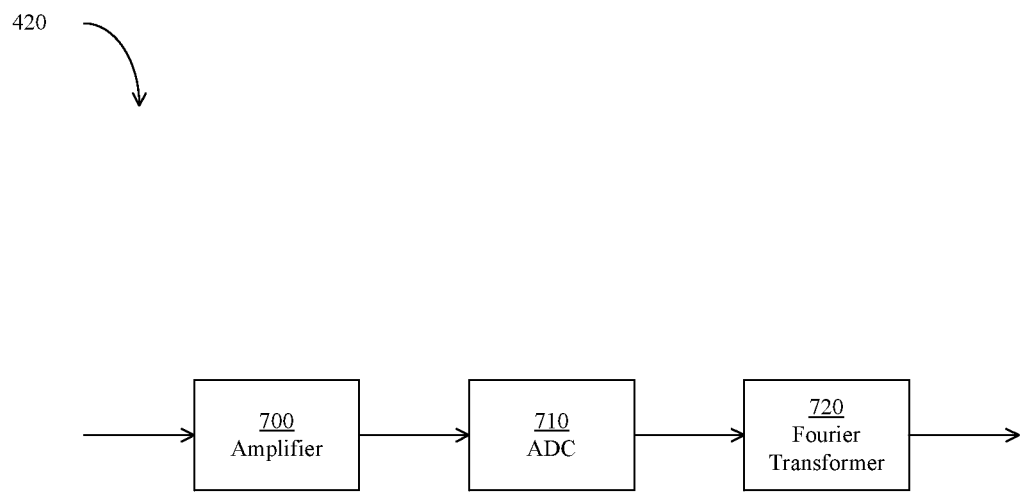
FIG. 7 is a block diagram depicting a portion of a digital demodulator in accordance with an embodiment of the present invention.

Referring to FIG. 7, a block diagram depicting a portion of a digital demodulator 420 in accordance with an embodiment of the present invention is shown. The embodiment shown in FIG. 7 is carried out in a digital manner, and a single digital demodulator shown in FIG. 7 can be used to demodulate every frequency. An analog signal received from the receiver analog front end 410 can be passed through an optional amplifier 700 and then to an analog-to-digital converter (ADC) 705. Then, the outputted digital signal is sent to a Fourier transformer 720 to demodulate the signal strength of each frequency on the domain. The above Fourier transformer can be a digitalized Fast Fourier transformer.

Figure 8:
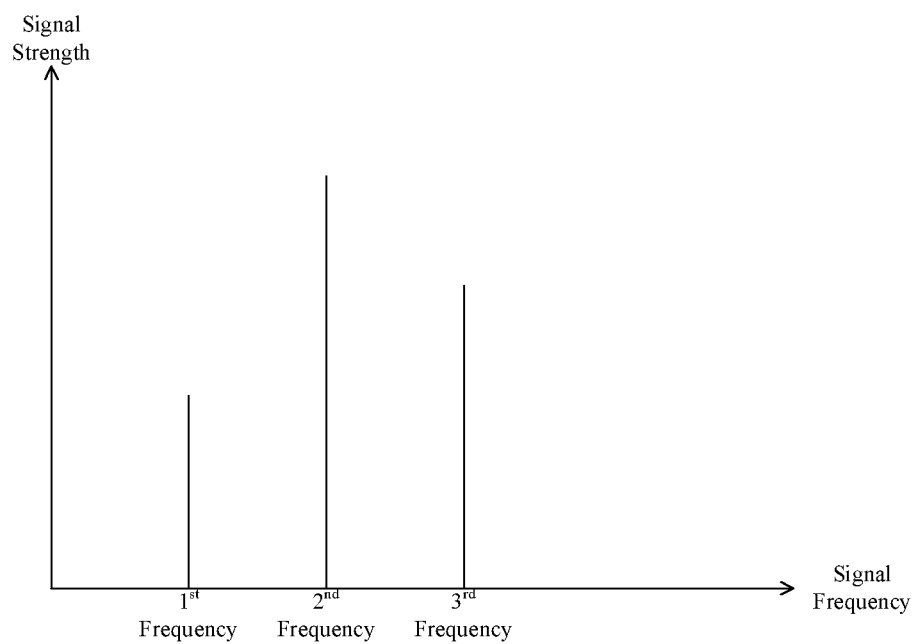
FIG. 8 is a schematic diagram depicting the result of demodulation according to the digital demodulator of FIG. 7.

Referring to FIG. 8, a schematic diagram depicting the result of demodulation according to the digital demodulator 420 of FIG. 7 is shown. The result shown in FIG. 8 is merely an illustration, apart from being represented by a diagram; other kinds of data structure can be used to store the result of demodulation. The horizontal axis shown in FIG. 8 indicates the signal frequency, and the vertical axis thereof indicates the signal strength. The calculated result from the Fourier transformer 720 gives the signal strengths corresponding to N frequencies possibly transmitted by the transmitter 100. In an embodiment, a threshold can be set for the signal strength. Only a signal with strength greater than the threshold would be regarded as a signal having a corresponding frequency. When the signal strength of each frequency is obtained, the ratios of each two frequencies and the overall signal strength can then be calculated.

Although the embodiments of the three demodulators 420 provided in FIGS. 5 to 7 can be implemented in the touch sensitive processing device 330 shown in FIG. 3, but the present invention does not restrict that the touch sensitive processing device 330 must implement all the steps of the demodulator 420. In some embodiments, some steps of the demodulator 420 can be performed by the Host 340. It should be noted that although the embodiments of the demodulators 420 can be implemented by specific hardware, but one with ordinary skills in the art can appreciate that each elements of the demodulators 420 can be implemented through software or firmware. For example, the mixers can be implemented by multiplication, and the Additive Integrators can be implemented by addition. Multiplication and addition are among the most common operation instructions.

Figure 9A:
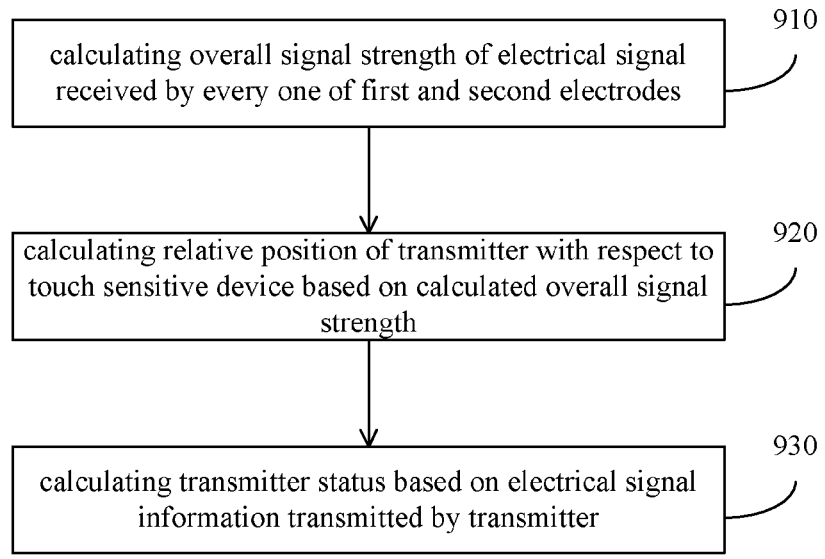
FIG. 9A is a flowchart illustrating a method for sensing a transmitter in accordance with an embodiment of the present invention.

Referring to FIG. 9A, a flowchart illustrating a method for sensing a transmitter in accordance with an embodiment of the present invention is shown. In step S910, the overall signal strength of the electrical signal received by every one of the first and second electrodes is calculated. Step 910 can be implemented using the embodiments shown in FIGS. 3 to 7. Then, in step 920, based on the calculated overall signal strength, a relative position of the transmitter with respect to a touch sensitive device is calculated. In an embodiment, the position of the transmitter is thought to be corresponding to the first and second electrodes having the largest overall signal strengths. In another embodiment, the position of the transmitter is thought to be corresponding to the centroid of adjacent first and second electrodes having the largest overall signal strengths, the size of the masses of these electrodes correspond to the strength of the signals. Finally, in an optional step 930, based on information of electrical signal transmitted by the transmitter, a transmitter status is calculated. One with ordinary skills in the art can appreciate that the implementation of step 930 can be deduced from the tables previously described.

Figure 9B:
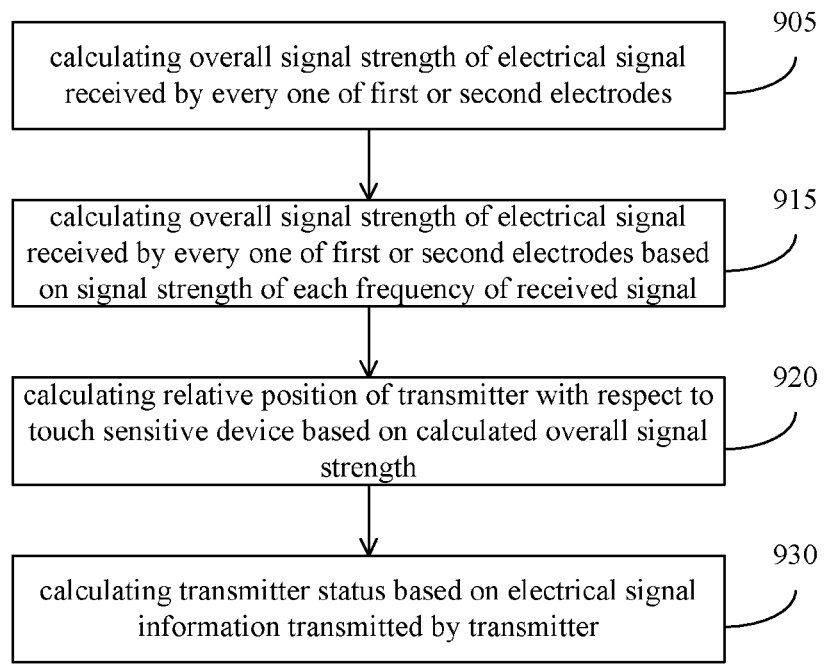
FIG. 9B is a flowchart illustrating a method for sensing a transmitter in accordance with an embodiment of the present invention.

Referring to FIG. 9B, a flowchart illustrating a method for sensing a transmitter in accordance with an embodiment of the present invention is shown. In step S905, the overall signal strength of the electrical signal received by every first or second electrode is calculated. Once the electrical signal received by every first or second electrode is demodulated, the frequencies of the signal transmitted by the transmitter can be known. For example, if the transmitter transmits a first frequency and a second frequency, but not a third frequency, then in the calculation of overall signal strengths of another electrode carried out in step 915, the calculation of the third frequency can be omitted. If the digital demodulator shown in FIG. 7 is employed, then the method shown in FIG. 9B is not required. However, if the demodulator described with respect to FIG. 5 or FIG. 6 is employed, then the number of demodulators will not be enough to scan all frequencies in one go, and the method of FIG. 9B can save some time and calculation resources. Moreover, if after the calculations of the first electrodes or the second electrodes, no electrical signal transmitted by the transmitter is found, then step 915 can be bypassed. On the contrary, if the electrical signal transmitted by the transmitter is found, then step 915 can calculate the overall signal strengths of the electrical signals received by the other electrodes. The descriptions of the embodiment of FIG. 9A apply to the remaining steps 920 and 930.

It should be noted that in the processes of FIGS. 9A and 9B, if no cause-and-effect relationships or order between the steps are mentioned, then the present invention does not limit the order in which these steps are carried out. In addition, in steps 905, 910 and 915, the overall signal strength of the electrical signal of every first and/or second electrode(s) is mentioned. In an embodiment, if the touch sensitive system 300 includes only a single transmitter 100, the processes of FIGS. 9A and 9B will be modified to: if the overall strength of the electrical signal received by at least one first electrode and second electrode is calculated to be greater than a threshold, then execute steps 920 and 930.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A transmitter for transmitting an electrical signal to a touch sensitive device according to a transmitter status, so that after analyzing the electrical signal, the touch sensitive device is able to find out the transmitter status and a relative position of the transmitter with respect to the touch sensitive device, comprising:
    a transmitting module for transmitting the electrical signal; and
    a sensor module, comprises:
        a first sensor having x possible statuses; and
        a second sensor having y possible statuses, and
    a processing module, coupled to the transmitting module and the sensor module, configured for generating the transmitter status according to a status of the sensor module,
    wherein the electrical signal is mixed from a plurality of signals having different frequencies concurrently, wherein the signal strength of the electrical signal corresponding to a status of the first sensor, wherein a ratio of the signal strengths of a first frequency to a second frequency mixed in the electrical signal corresponding to a status of the second sensor.

2. The transmitter of claim 1, wherein a sensor in the sensor module includes one of the following:
    a button;
    a knob;
    a pressure sensor;
    an accelerometer; and
    a gyroscope.

3. The transmitter of claim 1, wherein when the sensor module includes a plurality of sensors, a number of possible statuses of the transmitter status is a sum of the number of possible statuses of every one of the plurality of sensors.

4. The transmitter of claim 1, wherein the status representations of the first sensor or the second sensor is a n multiple of two, wherein n is an integer greater than or equal to 1.

5. A transmitting method for a transmitter, wherein the transmitter comprises a transmitting module, a sensor module includes a first sensor having x possible statuses and a second sensor having y possible statuses, and a processing module coupled to the transmitting module and the sensor module, the transmitting method comprising:
generating, by the processing module, a transmitter status according to a status of the sensor module; and
transmitting, by the transmitting module, an electrical signal to a touch sensitive device according to the transmitter status, so that after analyzing the electrical signal, the touch sensitive device is able to find out the transmitter status and a relative position of the transmitter with respect to the touch sensitive device, wherein the electrical signal is mixed from a plurality of signals having different frequencies concurrently, wherein the signal strength of the electrical signal corresponding to a status of the first sensor, wherein a ratio of the signal strengths of a first frequency to a second frequency mixed in the electrical signal corresponding to a status of the second sensor.

6. The transmitting method of claim 5, wherein a sensor in the sensor module includes one of the following:
a button;
a knob;
a pressure sensor;
an accelerometer; and
a gyroscope.

7. The transmitting method of claim 5, wherein when the sensor module includes a plurality of sensors, a number of possible statuses of the transmitter status is a sum of the number of possible statuses of every one of the plurality of sensors.

8. The transmitting method of claim 5, wherein the status representations of the first sensor or the second sensor is a n multiple of two, wherein n is an integer greater than or equal to 1.

9. A touch sensitive system, comprising:
a transmitter, further comprises:
a transmitting module for transmitting the electrical signal according to a transmitter status; and
a sensor module, comprises:
a first sensor having x possible statuses; and
a second sensor having y possible statuses, and
a processing module, coupled to the transmitting module and the sensor module, configured for generating the transmitter status according to a status of the sensor module, and
a touch sensitive device for receiving and analyzing the electrical signal and finding out the transmitter status and a relative position of the transmitter with respect to the touch sensitive device,
wherein the electrical signal is mixed from a plurality of signals having different frequencies concurrently, wherein the signal strength of the electrical signal corresponding to a status of the first sensor, wherein a ratio of the signal strengths of a first frequency to a second frequency mixed in the electrical signal corresponding to a status of the second sensor.

10. The touch sensitive system of claim 9, wherein a sensor in the sensor module includes one of the following:
a button;
a knob;
a pressure sensor;
an accelerometer; and
a gyroscope.

11. The touch sensitive system of claim 9, wherein when the sensor module includes a plurality of sensors, a number of possible statuses of the transmitter status is a sum of the number of possible statuses of every one of the plurality of sensors.

12. The touch sensitive system of claim 9, wherein the status representations of the first sensor or the second sensor is a n multiple of two, wherein n is an integer greater than or equal to 1.

* * * * *